(12) United States Patent
Serdy, Jr. et al.

(10) Patent No.: US 7,773,106 B2
(45) Date of Patent: Aug. 10, 2010

(54) SYSTEM AND APPARATUS FOR SENDING COMPLETE RESPONSES TO TRUNCATED ELECTRONIC MAIL MESSAGES ON A MOBILE DEVICE

(75) Inventors: Frank S. Serdy, Jr., Sammamish, WA (US); Selvarai Nalliah, Redmond, WA (US); David R. Williamson, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1622 days.

(21) Appl. No.: 10/452,275

(22) Filed: Jun. 2, 2003

(65) Prior Publication Data

US 2004/0090457 A1    May 13, 2004

(51) Int. Cl.
*G06F 3/00* (2006.01)
*G06F 9/00* (2006.01)
*G06F 17/00* (2006.01)

(52) U.S. Cl. .................. 345/752; 709/245; 709/217; 715/752; 715/865; 715/748

(58) Field of Classification Search .............. 709/245, 709/217; 715/752, 865, 748, 751, 864, 764
See application file for complete search history.

(56) References Cited

U.S. PATENT DOCUMENTS

| 5,764,899 | A | 6/1998 | Eggleston et al. | 395/200.33 |
|---|---|---|---|---|
| 6,421,707 | B1* | 7/2002 | Miller et al. | 709/206 |
| 6,938,076 | B2* | 8/2005 | Meyer et al. | 709/219 |
| 7,136,897 | B1* | 11/2006 | Raghunandan | 709/206 |

OTHER PUBLICATIONS

Examination Report, EP Application No. 06 005 660.3-1244, dated Mar. 14, 2007.

* cited by examiner

*Primary Examiner*—Kieu Vu
*Assistant Examiner*—Sabrina L. Greene

(57) ABSTRACT

The present invention allows mobile users to send replies to, or to forward, truncated electronic mail messages, and yet still send the entire body of the original electronic mail message, without having to download the entire body of the mail message locally to the mobile device and then re-transmit the entire message from the mobile device.

12 Claims, 11 Drawing Sheets

SYSTEM AND APPARATUS FOR SENDING COMPLETE RESPONSES TO TRUNCATED ELECTRONIC MAIL MESSAGES ON A MOBILE DEVICE

BACKGROUND OF THE INVENTION

The present invention relates to electronic mail messaging through a synchronization protocol using a mobile device. More specifically, the present invention relates to responding to truncated electronic mail messages on a mobile device.

Mobile devices include a broad range of computing and communication devices that are small enough to be conveniently carried by a user. Examples of such devices include mobile phones, personal digital assistants, tablet PCs, and lap-top PCs.

Generally, the mobile device includes a processor, random access memory (RAM), and an input device such as a keyboard, touchpad or input buttons and a display. The keyboard can be integrated with the display, such as when the keyboard is incorporated as a touch sensitive display. A communication interface is optionally provided and is commonly used to communicate with other computers. A replaceable or rechargeable battery powers the mobile device. Optionally, the mobile device can receive power from an external power source that overrides or recharges the built-in battery.

While a wide variety of computing tasks and applications can be performed by such mobile devices, personal information managers (PIMs) are particularly well suited to mobile devices. PIMs typically comprise applications which enable the user of the mobile device to better manage scheduling and communications, and other such tasks. Some commonly available PIMs include scheduling and calendar programs, task lists, address books, and electronic mail (e-mail) programs. Some commonly commercially available PIMs are sold under the trademarks "MICROSOFT SCHEDULE+" and "MICROSOFT OUTLOOK" and are commercially available from Microsoft Corporation of Redmond, Wash. In addition to PIMs, however, such mobile devices may also run different types of applications, such as word processors, spread sheets, etc.

To provide users with as much freedom as possible, it is desirable to allow the user to access and change their application and PIM information from any device they choose. Thus, the user should be able to access their e-mail from a network terminal, a PDA, and a tablet PC, for example.

However, allowing the user to access and change their information from any desired source means that the devices must be able to communicate with each other to indicate changes to the information. The process of two devices sharing changes in the application and/or PIM information is known as synchronization.

In general, synchronization is not a continuous process. In other words, a mobile device does not continually try to synchronize its data because that would waste limited wireless bandwidth and place an undue drain on the mobile device's battery. Instead, synchronization is performed periodically. In addition, since the mobile device is not always in use, it is wasteful to have a server or desktop computer periodically attempt to establish a connection with the mobile device to perform synchronization. Instead, the mobile device is responsible for establishing a connection to perform synchronization.

In the past, in order to accommodate limited transmition bandwidths, mobile devices often received truncated electronic mail messages. In other words, if a mail message had a long message body, it was often transmitted to the mobile device in truncated fashion, in which a pre-designated number of lines of text in the main message body were sent and the rest of the main message body was not. In such mobile devices, the user could then select the message for download and have the entire text of the message downloaded to the mobile device. The same generally applied to attachments. Initially, they would not be sent to the mobile device but could be selected for download.

Also, in the past, in order to reply to, or forward, electronic mail messages from a mobile device, the user simply executed the necessary instructions required by the particular electronic mail messaging PIM. The electronic mail message object created when the user indicated that the reply or forward should be sent was then transmitted, on a periodic basis, to a server which sent the electronic mail message object to the appropriate recipient. However, where the user was replying to, or forwarding, a truncated electronic mail message, then only the truncated message was sent on to the ultimate recipient identified in the forwarded or reply message.

SUMMARY OF THE INVENTION

The present invention allows mobile users to send replys to, or to forward, truncated electronic mail messages, and yet still send the entire body of the original electronic mail message, without having to download the entire body of the mail message locally to the mobile device and then re-transmit the entire message from the mobile device.

DETAILED DESCRIPTION OF THE ILLUSTRATIVE EMBODIMENTS

Overview

Figure 1:
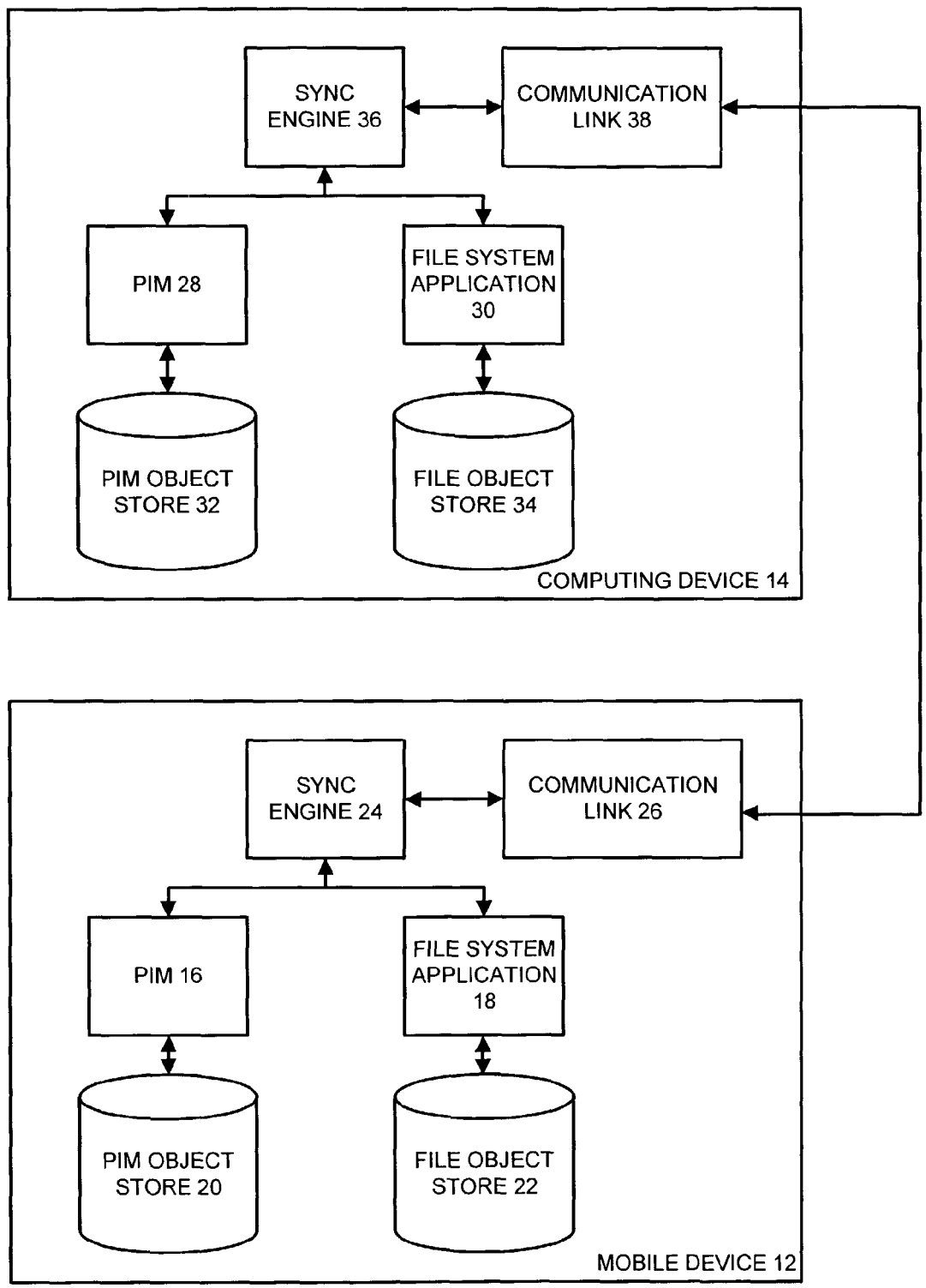
FIG. 1 is a block diagram illustrating a basic environment of the present invention.

FIG. 1 is a block diagram of a typical system or environment 10 in which the present invention operates. Responding to electronic mail messages utilizing the synchronization protocol is discussed in detail with respect to FIG. 9, but the present overview is provided for clarity only. System 10 includes mobile device 12 and a computing device 14. Mobile device 12 includes first application program 16, second application program 18, corresponding first and second object stores 20 and 22, synchronization engine 24 and communication link 26. Computing device 14 includes first and second application programs 28 and 30, corresponding first and second object stores 32 and 34, synchronization engine 36 and communication link 38. It will be appreciated that both mobile device 12 and computing device 14 include a number of other components (including, for example, components and timers used to schedule synchronization operations), which are discussed in greater detail below. However, for the purposes of the overview discussion presented with respect to FIG. 1, the items set out above are sufficient.

In one illustrative embodiment of the present invention, application programs 16 and 28 are personal information manager (PIM) programs, which support, for example, electronic mail messaging, scheduling, calendering, etc. Hereinafter, programs 16 and 28 will simply be referred to as PIMs 16 and 28. Of course, PIMs 16 and 28 can be configured to support a wide variety of other features, such as task lists and personalized address books, to name a few.

Object stores 20 and 32 are implemented in memory configured to store a plurality of individual records or objects, each comprising a plurality of fields or properties related to PIMs 16 and 28. In one illustrative embodiment, PIMs 16 and 28 are programs, such as that available under the commercial designation "MICROSOFT OUTLOOK", and object stores 20 and 23 are configured to store objects, each of which having a plurality of attributes or properties associated with electronic mail messaging, such as a sender's name, the recipient's name, text messages, etc. Computing device 14 executes PIM 28 to maintain objects stored in store 32, and mobile device 12 executes program 16 to maintain objects stored in object store 20. In one illustrative embodiment, each object in object store 20 comprises the same set of properties or attributes stored in object store 32, or a subset of those properties or attributes.

Similarly, application programs 18 and 30 maintain objects on associated object stores 22 and 34, respectively. In one illustrative embodiment, application programs 18 and 30 are file system applications, such as those available under the commercial designation "MICROSOFT WORD". It should also be noted that any suitable number of other application programs, and associated object stores, can be provided on mobile device 12 and computing device 14. However, for the sake of simplicity, only programs 16, 18, 28 and 30, and their associated object stores, are described herein.

In one illustrative embodiment, the user desires to synchronize object stores 20 and 32 and object stores 22 and 34. Thus, there are two instances of each object associated with the pair of object stores 20 and 32 (one instance in object store 20 and one instance in object store 32) and two instances of each object associated with the pair of object stores 22 and 34 (one instance in object store 22 and one instance in object store 34). When a user changes one instance of the object stored in either object store 22 or 34, the second instance of that object in the other of stores 22 and 34 is out of sync and is desirably updated the next time mobile device 12 has two-way communication with computing device 14, so that both instances of the same object contain synchronized data. The same is true for instances of objects stored in object stores 20 and 32.

In order to accomplish synchronization, synchronization components 24 and 36 run on mobile device 12 and computing device 14, respectively. The synchronization components communicate with application programs 16, 18, 28 and 30 (or directly with the associated object stores) through any well defined interfaces to manage communication and synchronization.

Synchronization components 24 and 36 communicate with each other through communication links 26 and 38. Communication links 26 and 38 are illustratively commercially available communication links using a suitable communications protocol. For instance, in one illustrative embodiment, mobile device 12 is connected to computing device 14 with a physical cable which communicates using a serial communications protocol. Other communication mechanisms are also contemplated by the present invention, such as infrared (IR) communication, direct modem communication, remote dial-up-networking communication, communication through commercially available network cards (i.e., using TCP/IP), remote access services (RAS), wireless modem, wireless cellular digital packet data (CDPD), short message services or other suitable communication mechanisms. Although the communication links are shown as being internal to mobile device 12 and computing device 14, those skilled in the art will recognize that portions of the communication links exist outside of the devices. For example, the communication links can include communication servers located between mobile device 12 and computing device 14, other portions of the network forming the communication link (such as the cellular and PSTN networks) and adapters such as mobile device cradles.

Prior to discussing the synchronization process and associated mechanisms in greater detail, the present discussion proceeds with respect to a more detailed description of the components of mobile device 12 and an example computing device 14 for the sake of clarity.

Computing Device 14

Computing device 14 is only one example of a suitable computing device and is not intended to suggest any limitation as to the scope of use or functionality of the invention. Neither should computing device 14 be interpreted as having any dependency or requirement relating to any one or combination of components illustrated in the exemplary computing device 14.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
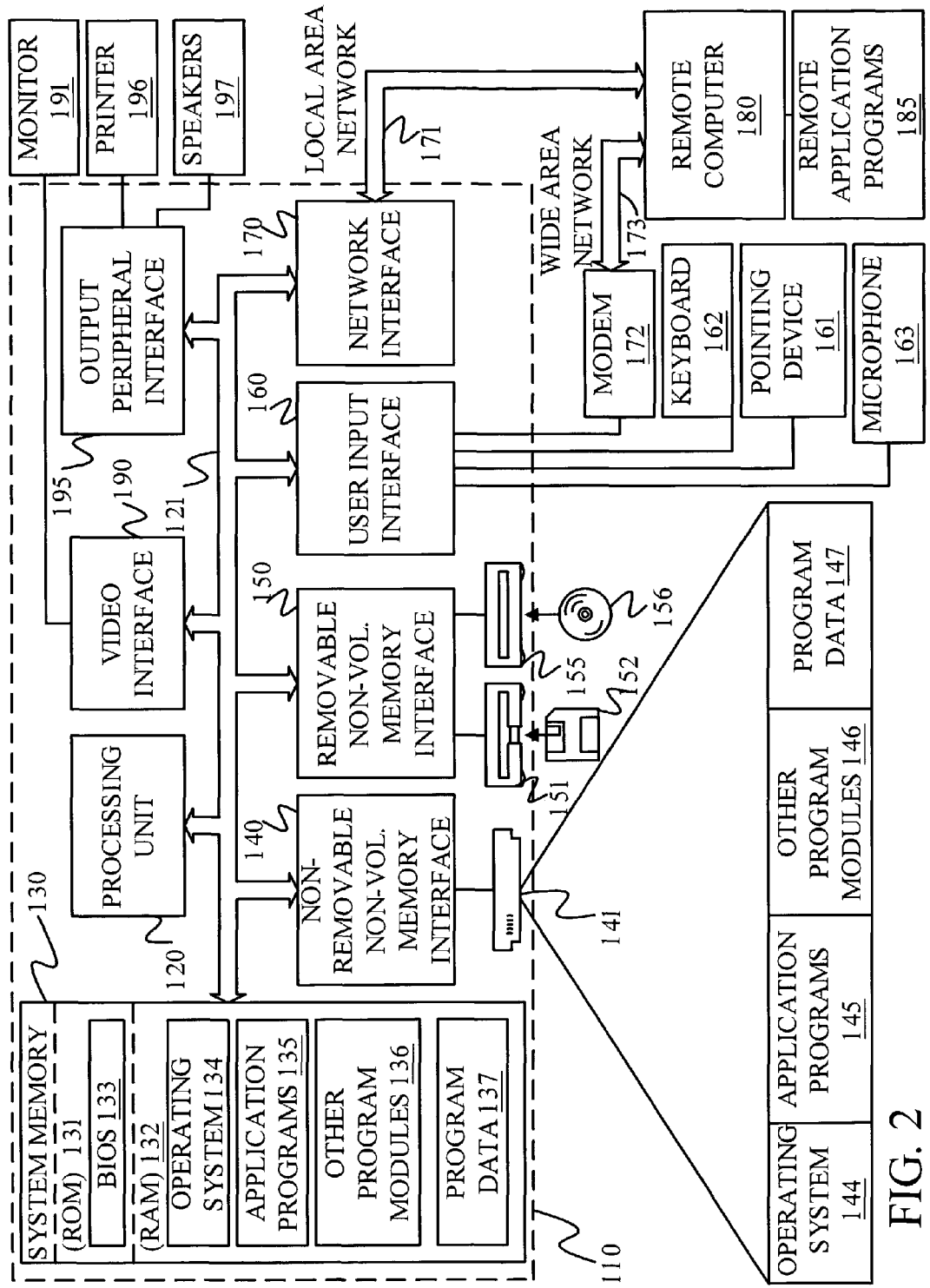
FIG. 2 is a block diagram of one embodiment of a conventional desktop computer used in conjunction with a mobile device in accordance with the present invention.

With reference to FIG. 2, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180, which can include mobile device 12. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet. In addition, the network connections between any of the nodes in the network may include direct cable connections or wireless connections and the connection between computer 110 and remote computer 180 may include any number of nodes and/or routers.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

Dynamically linked libraries (DLLs), comprising a plurality of executable functions are associated with PIM 28 and application 30 for execution by processor 62. Interprocessor and intercomponent calls are facilitated preferably using the component object model (COM) as is common in programs written for Microsoft "WINDOWS" brand operating systems. Briefly, when using COM, a software component such as a DLL has a number of interfaces. Each interface exposes a plurality of methods, which can be called individually to utilize different services offered by the software component. In addition, interfaces are provided such that methods or functions can be called from other software components which optionally receive and return one or more parameter arguments.

In general, the DLLs associated with PIM 28 and program 30 are designed specifically to work in conjunction with PIM 28 and program 30 and to expose desktop synchronization interfaces that function according to a synchronization protocol. The DLLs, in turn, call interfaces exposed by PIM 28 and program 30 in order to access data representing individual properties of objects maintained in object stores 32 and 34. Object stores 32 and 34, of course, can reside in any one of the suitable memory components described with respect to FIG. 2.

Mobile Device 12

Figure 3:
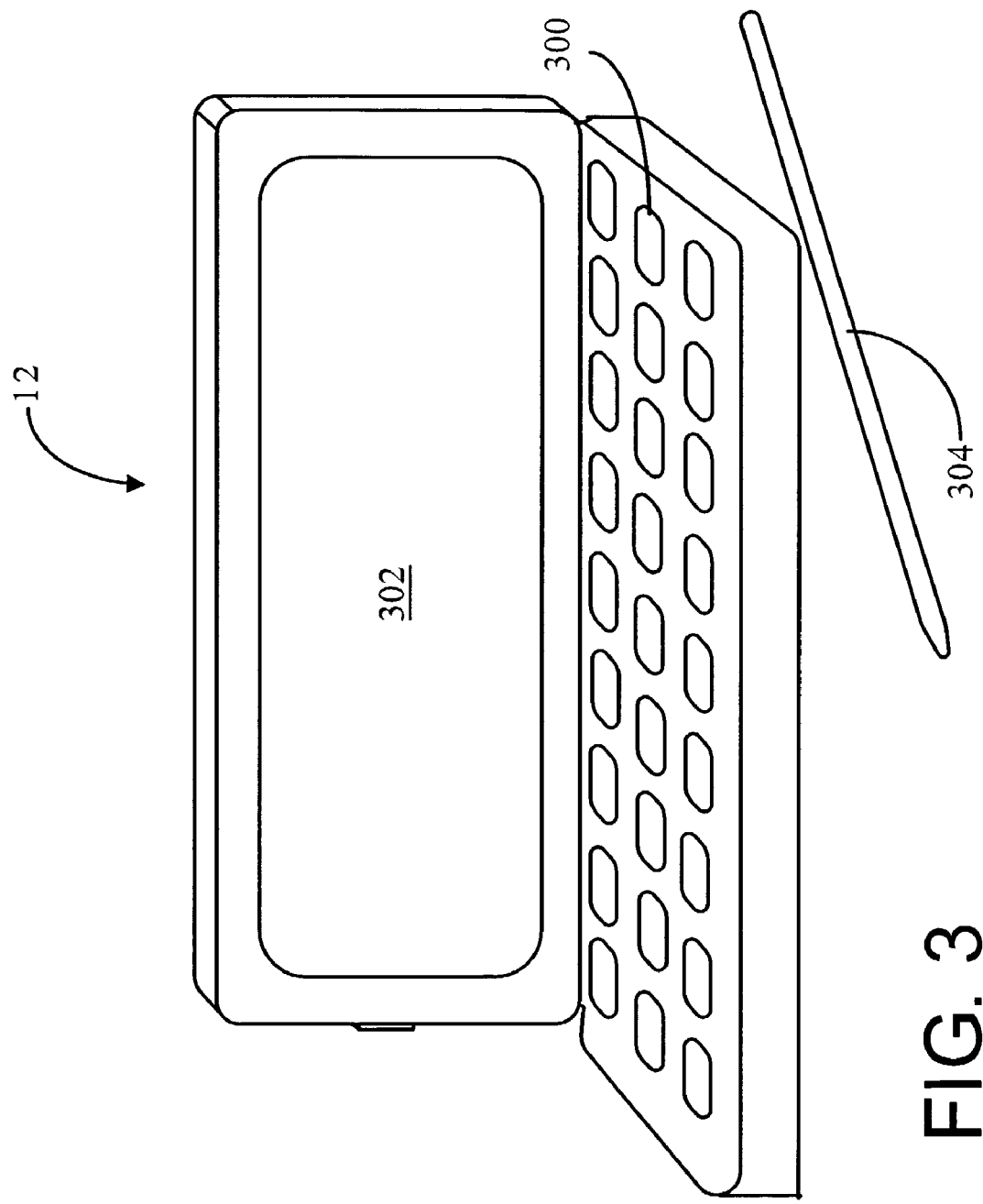
FIG. 3 is a simplified pictorial illustration of one embodiment of a mobile device in accordance with the present invention.

FIG. 3 is a simplified pictorial illustration of one preferred embodiment of a mobile device 12 which can be used in accordance with the present invention. In one embodiment, mobile device 12 includes a miniaturized keyboard 300, display 302 and stylus 304. In the embodiment shown in FIG. 3, display 302 is a liquid crystal display (LCD) which uses a contact sensitive display screen in conjunction with stylus 304. Stylus 304 is used to press or contact the display 302 at designated coordinates to accomplish certain user input functions. Miniaturized keyboard 300 is illustratively implemented as a miniaturized alpha-numeric keyboard, with any suitable and desired function keys which are also provided for accomplishing certain user input functions.

Figure 4:
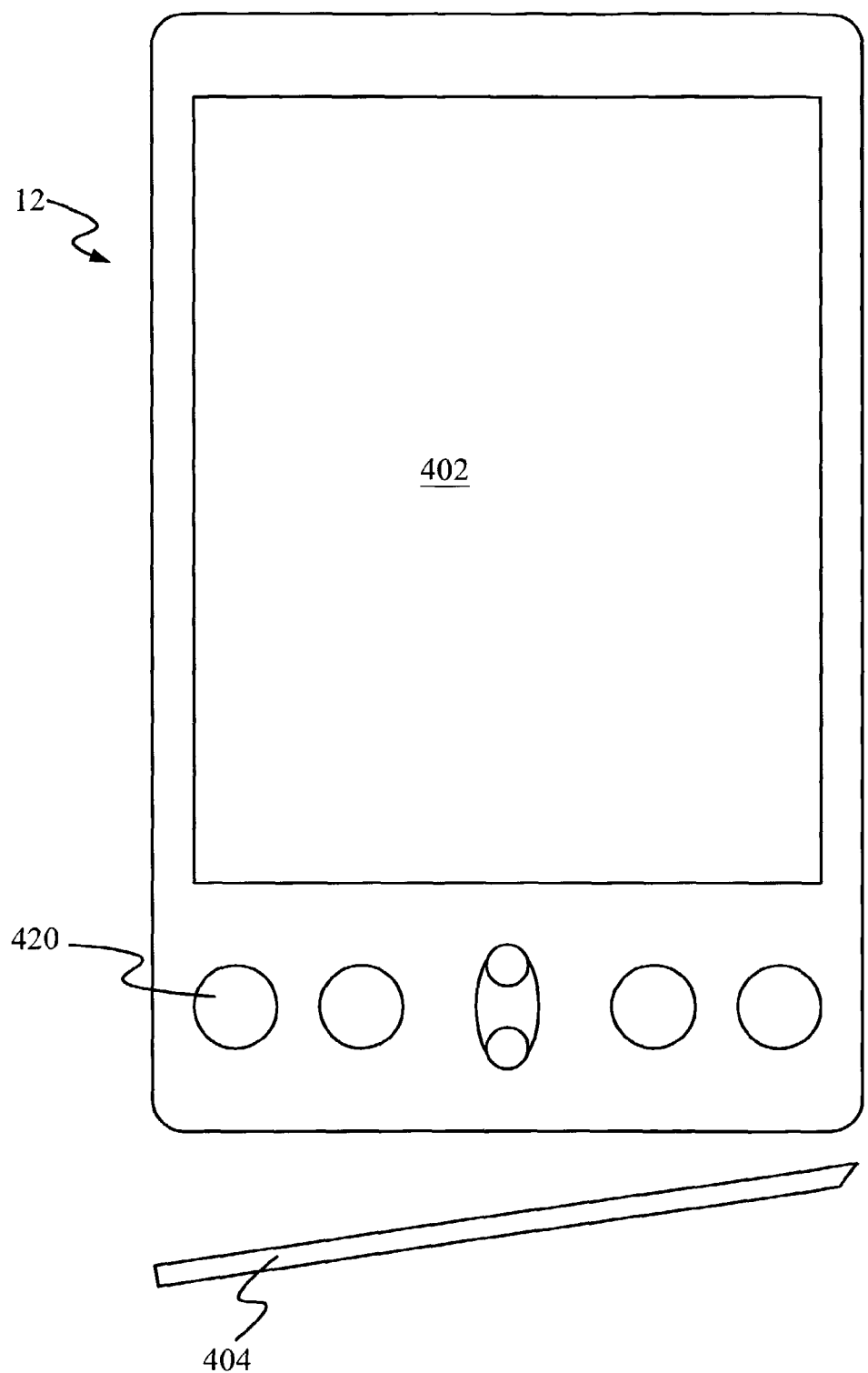
FIG. 4 is a simplified pictorial illustration of another embodiment of a mobile device in accordance with the present invention.

FIG. 4 is an illustration of a different embodiment of mobile device 12. Mobile device 12, as shown in FIG. 4, includes a touch sensitive screen 402 which can be used, in conjunction with stylus 404, to accomplish certain user input functions.

It should be noted that the displays 302 and 402 for the mobile devices shown in FIGS. 3 and 4 can be the same size as one another, or different sizes from one another, but would typically be much smaller than a conventional display used with a desktop computer. For example, displays 302 and 402 shown in FIGS. 3 and 4 may be defined by a matrix of only 240×320 coordinates, or 160×160 coordinates, or any other suitable size. When mobile device 12 is a pager, the display may be even smaller.

The mobile device 12 shown in FIG. 4 also includes a number of user input keys or buttons (such as button 420) which allow the user to scroll through menu options or other display options which are displayed on display 402, or which allow the user to change applications or select user input functions, without contacting display 402.

Note that other forms of the mobile device are possible under the present invention. Examples include mobile phones that are capable of performing computing tasks, tablet PCs and wireless-enabled lap-top computers, to name a few.

Figure 5:
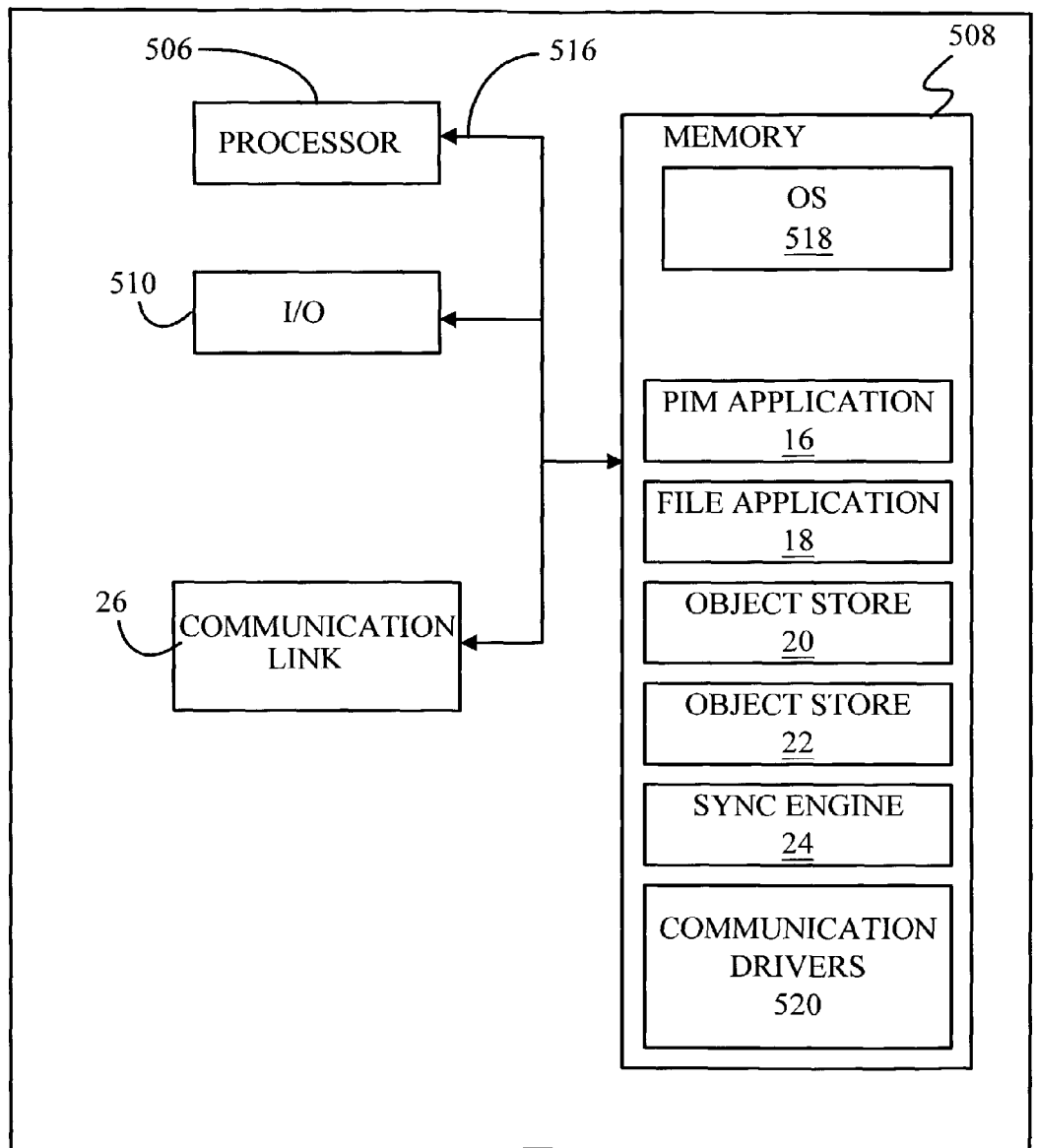
FIG. 5 is a simplified block diagram of one embodiment of the mobile device shown in FIG. 3 or 4.

FIG. 5 is a more detailed block diagram of mobile device 12. Mobile device 12 illustratively includes microprocessor 506, memory 508, input/output (I/O) components 510, and communication links 26. These components of mobile device 12 can be coupled for communication with one another over a suitable bus 516.

Memory 508 is illustratively implemented as nonvolatile electronic memory such as random access memory (RAM) with a battery back-up module (not shown) such that information stored in memory 508 is not lost when the general power to mobile device 12 is shut down. A portion of memory 508 is illustratively allocated as addressable memory for program execution, while another portion of memory 508 is optionally used for storage, such as to simulate storage on a disc drive.

Memory 508 can include operating system 518, one or more application programs (such as PIM 16 and file application 18, etc.), as well as object stores 20 and 22 and sync engine 24. During operation, operating system 518 is illustratively executed by processor 506 from memory 48. The operating system 518 implements features which can be utilized by PIM 16 and file application 18 through a set of exposed application programming interfaces and methods. The objects in object stores 20 and 22 are illustratively maintained by PIM 16, file application 18 and operating system 518, at least partially in response to calls to the exposed application programming interfaces and methods.

I/O components 510, in one embodiment, are provided to facilitate input and output operations from a user of mobile device 12. I/O components 510 for various embodiments of mobile device 12 can include input components such as buttons and touch sensors and output components such as a display, a speaker, and/or a printer port, etc.

Communication link 26 is any suitable communication interface. Interface 26 is illustratively used to communicate with computing device 14 as described with respect to FIG. 1. Memory 508 includes a set of communication drivers 520 that interact with communication link 26 and that translate data to and from the appropriate communication protocol necessary to allow for communication across link 26.

Figure 6:
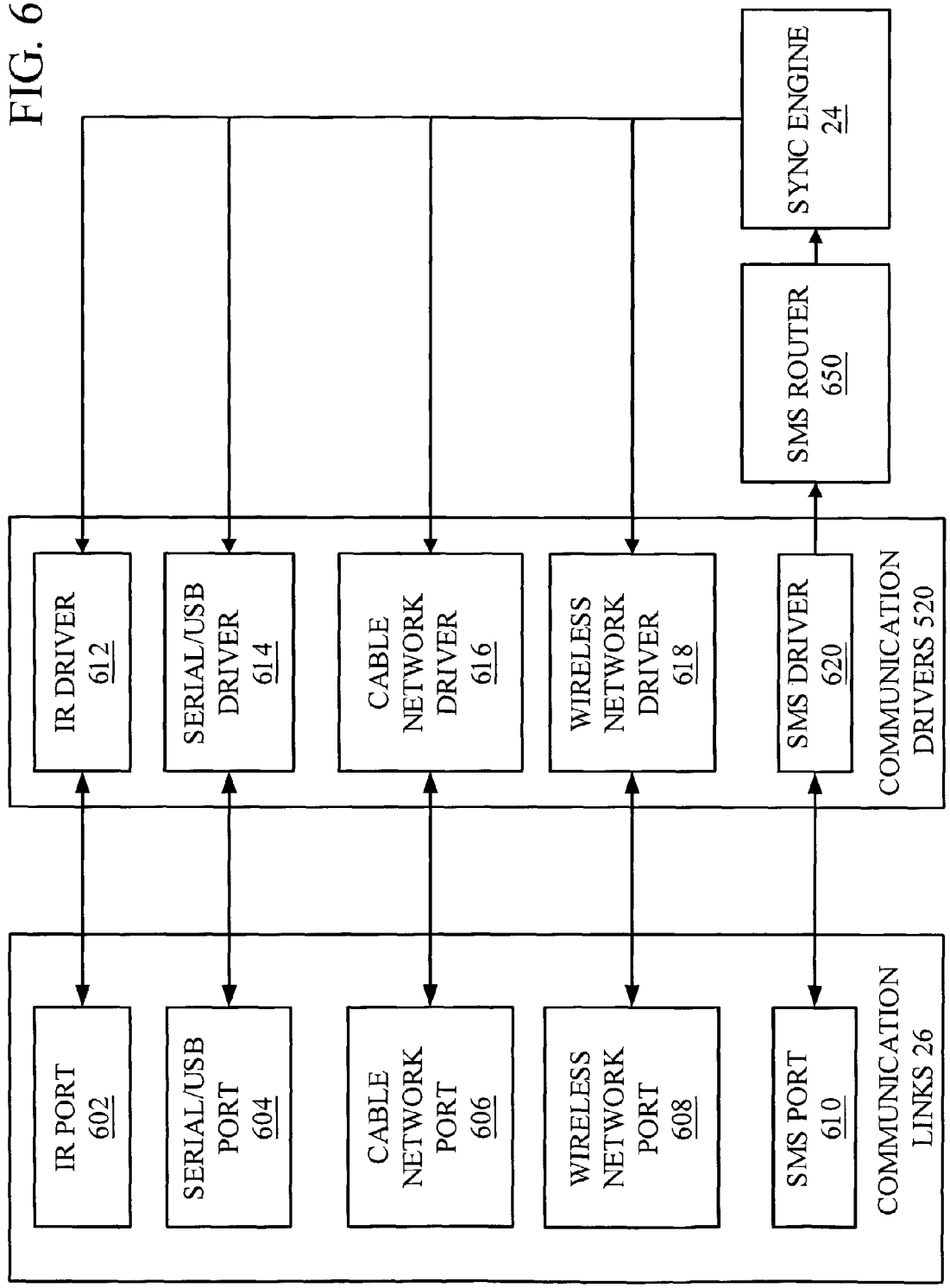
FIG. 6 is an architectural block diagram illustrating one embodiment of portions of the desktop computer shown in FIG. 2 and the mobile device shown in FIGS. 3-5 to illustrate synchronization of information stored in object stores on the desktop computer and the mobile device in accordance with one embodiment of the present invention.

FIG. 6 provides a block diagram showing communication link 26 and communication drivers 520 in more detail. In particular, FIG. 6 shows communication link 26 as containing a number of communication ports 602, 604, 606, 608 and 610 that communicate with devices outside of the mobile device. Each port has an associated driver 612, 614, 616, 618, and 620, respectively, in communications drivers 520. IR port 602 and IR driver 612 provide communication across an infrared communication channel between the mobile device and another computing device. Serial/USB port 604 and Serial/USB driver 612 provide communication over a serial or USB channel. Cable network port 606 and cable network driver 616 provide communication over a network cable such as an Ethernet cable.

Wireless network port 608 and wireless network driver 618 provide communication to a network over a radio channel. Wireless network port 608 and driver 618 can use any number of wireless network protocols including General Packet Radio Service (GPRS) and 1Xrtt, which are wireless services used to provide cellular access to a network, as well as 802.11 and 802.11b (Wi-Fi) protocols, and Bluetooth™ protocol, which provide local wireless connections to networks. Of course, others can be used as well.

SMS port 610 and SMS driver 620 support one-way communication using the Short Message Service protocol. Thus, SMS port 610 is able to receive SMS messages that are broadcast using the radio spectrum.

Overview of Synchronization

Figure 7:
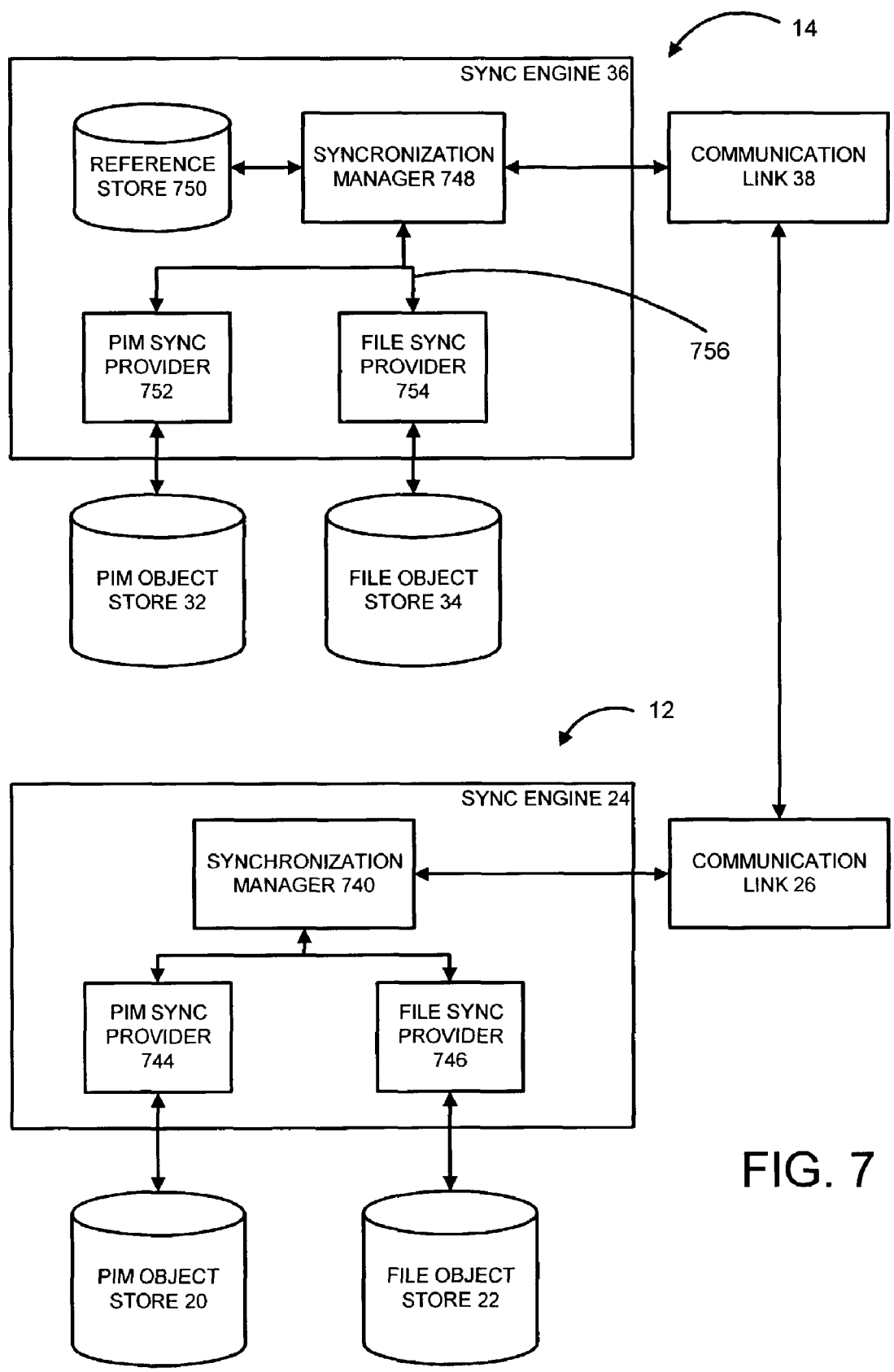
FIG. 7 is a more detailed block diagram of portions of sync engines shown in FIG. 1.

FIG. 7 is a more detailed block diagram of sync engine 24 on mobile device 12 and sync engine 36 on desktop 14. Sync engine 24 on mobile device 12 includes synchronization manager 740, which is coupled to a set of application programs, such as PIM sync provider 744 and file sync provider 746. PIM sync provider 744 is coupled to PIM object store 20, and file sync provider 746 is coupled to file object store 22.

Sync engine 36 on computing device 14 also includes a synchronization manager 748 coupled to an associated reference store 750 and also coupled to application programs, including PIM sync provider 752 and file sync provider 754. PIM sync provider 752 is coupled to PIM object store 32, and file sync provider 754 is coupled to file object store 34. While providers 744, 746, 752 and 754 are shown coupled directly to associated object stores, those providers could also be coupled to the object stores through the application programs 16, 18, 28 and 30 instead. However, for the sake of simplicity, the present discussion proceeds only with respect to the arrangement shown in FIG. 7.

Sync providers 752 and 754 expose application programming interfaces (APIs) 756 which can be called by sync manager 748 to read and store objects and object properties on object stores 32 and 34. The interfaces 756 generally allow the creation of data bases for different types of objects, and allow application programs to read and write property names and values to and from respective objects within each data base. A number of exemplary interfaces are now described, but form no part of the invention and are discussed for purposes of example and completeness only.

The interfaces are well documented as the IReplStore, and IReplObjHandler interfaces. Each of these interfaces exposes a number of well documented methods. For example, the IReplStore interface exposes 22 methods which can be generally classified as methods which are used to access and modify the data store, methods used for object enumeration, methods used to obtain object information, methods used to manipulate handles to objects, methods used for user interface functions, and a number of miscellaneous methods. The IReplObjHandler interface exposes methods which are used to serialize objects by turning an object into a series of bytes, and to deserialize objects by turning the series of bytes back into an object. The methods included in the interface are also used to delete an object from the corresponding object store.

Sync manager 748, in turn, exposes a well documented interface known as the IReplNotify interface to providers 752 and 754. This interface exposes four well documented methods which are used to notify sync manager 748 of any change or deletion made to an object in a corresponding object store, to set text to be displayed in a status bar where synchronization status can be observed by the user, to obtain a window handle which is used as a parent window of any modal dialogue or message box, and to obtain information about a mobile device which has been selected, or which is connected to the computing device.

Each of the providers 752 and 754 are implemented to specifically work in conjunction with a particular application program 28 or 34, respectively. In general, because the application program interface (API) 756 is standardized, it allows synchronization manager 748 to access and synchronize any number of different application programs, as long as the required interface methods are implemented for each application by corresponding providers.

On mobile device 12, providers 744 and 746 also provide the well documented IReplObjHandler interface such that objects in the associated object stores 20 and 22 can be serialized and deserialized. Providers 744 and 746 also illustratively implement three additional functions which can be used to initialize and terminate the provider, to handle object identification and change detection, and to retrieve device information about a particular object type. These functions and interfaces are also well documented.

Synchronization manager 748 manipulates reference store 750 to maintain a mapping between instances of objects stored in object stores 32 and 34 on computing device 14 and instances of the same objects stored in object stores 20 and 22 on mobile device 12. Objects are identified by handles which are created by providers 752 and 754. The handles are opaque to synchronization manager 748, in that synchronization manager 748 need not be concerned with the actual composition of the handles although the handles are manipulated and stored by synchronization manager 748.

Generally, in order to maintain the mapping, synchronization manager 748 maintains reference store 750 so that it contains handles corresponding respectively to a plurality of objects in the object stores 32 and 34 on computing device 14 which are to be synchronized with instances of the same objects in object stores 20 and 22 on mobile device 12. The handles in reference store 750 will typically correspond to objects that have been previously synchronized between the various object stores. The handles are updated after their corresponding objects have been synchronized.

The list of handles maintained in reference store 750 is also used to determine which items need to be synchronized to mobile device 12 the next time mobile device 12 is connected to computing device 14. In making this determination, synchronization manager 748 also determines whether objects have been added to or deleted from the object stores so that appropriate additions and deletions can be made.

The handles stored in reference store 750 may be formatted in accordance with the following criteria so that the synchronization providers 752 and 754 can perform the specified functions:

(a) Each handle may contain data that uniquely identifies an object—such as an object identifier, an ID number, a full pathname for a file system object, etc. This data may be persistent (in that it does not change for a particular object) and should not be reused for subsequently created objects. This data can be compared to determine whether two handles actually correspond to the same object. As is discussed below, this can be problematic for file system information, because the object identifier is typically the pathname, and can be changed simply by renaming the file.

(b) It may be possible to derive some object order based on the handle.

(c) The handle may have some sort of time stamp information, or version number. This information can be compared to determine whether an object has changed since the last handle was recorded in reference store 750.

These handles are provided from providers 752 and 754 to synchronization manager 748, for storage in reference store 750, during an enumeration process which is described below. This enumeration process is used to detect items which need to by synchronized when mobile device 12 is next coupled to computing device 14.

Figure 8A:
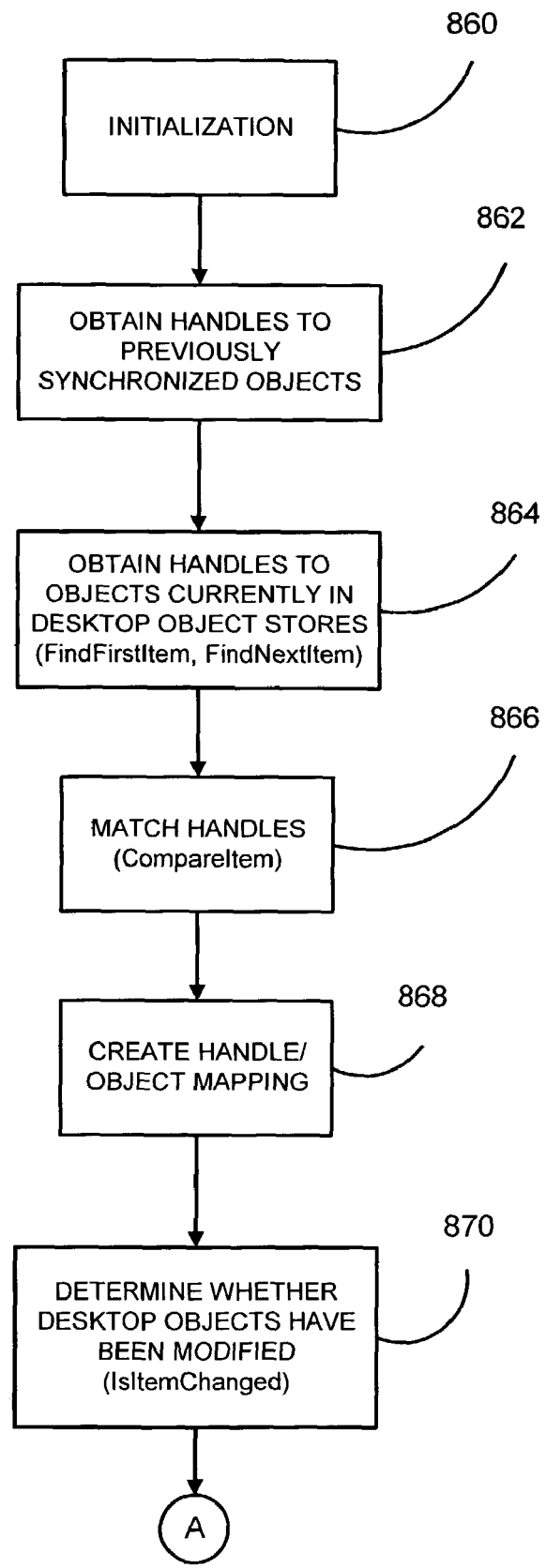
FIGS. 8A and 8B are flow diagrams illustrating a normal synchronization operation in accordance with one embodiment of the present invention.
Figure 8B:
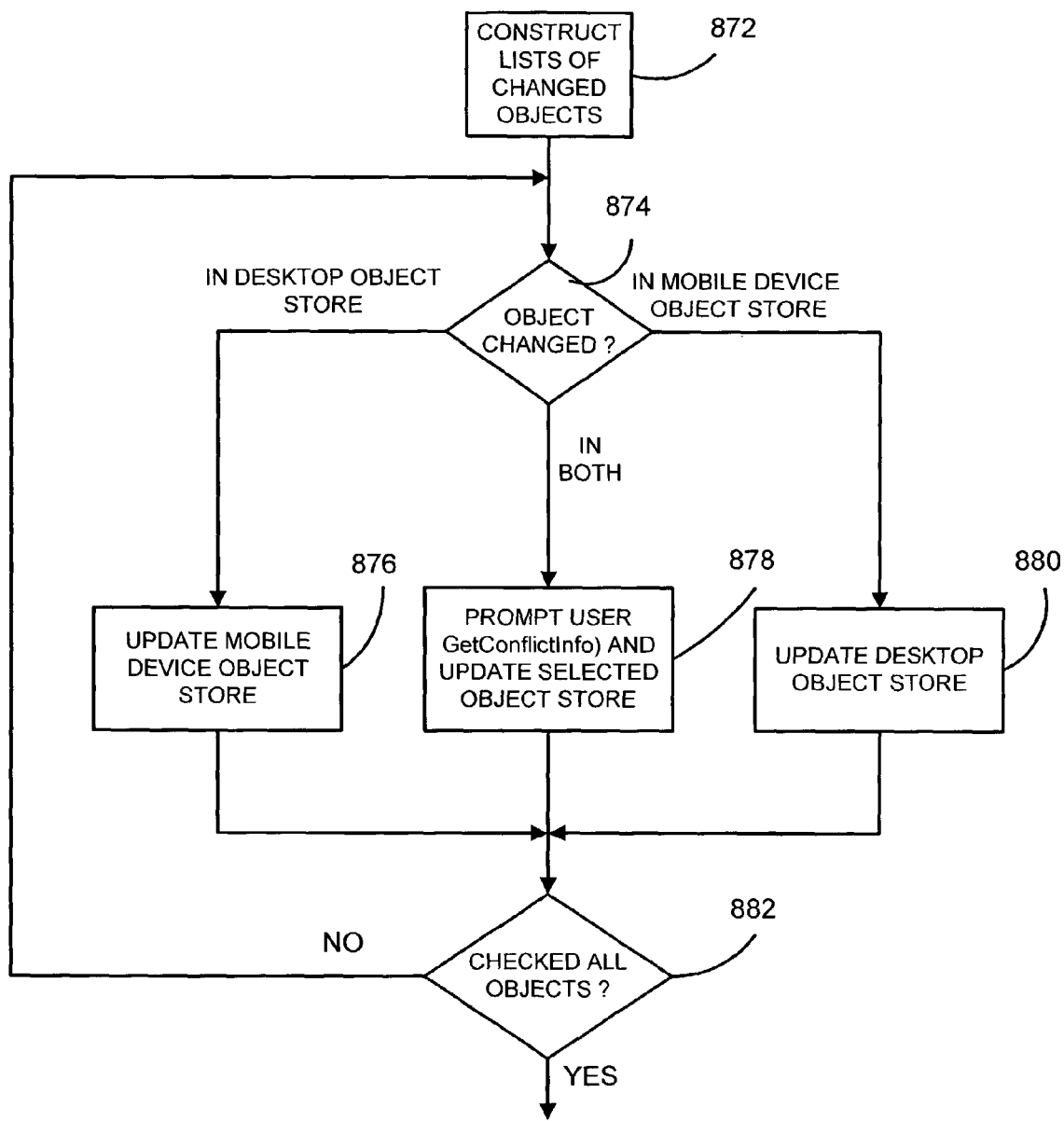

FIGS. 8A and 8B are flow diagrams illustrating the enumeration process which is periodically performed by sync engine 36 in obtaining and updating the list of handles stored in reference store 750 for the purpose of determining which items need to synchronized upon next connection. After an initialization step indicated by block 860, synchronization manager 748 constructs two lists of handles. The first list is obtained at step 862 by accessing the handles previously stored in reference store 750 that correspond to objects that were previously synchronized. The second list of handles is obtained at step 864 by querying each of the synchronization providers 752-754 using interface methods denoted by IReplObjHandler::FindFirstItem and FindNextItem. When successfully called, these interfaces enumerate an ordered list of handles corresponding respectively to a second group of objects, those objects currently in the object stores 32 and 34 corresponding to the providers 752 and 754 which have enumerated the objects.

By comparing the list of handles returned by the current enumeration with the saved list of handles loaded from reference store 750, synchronization manager 748 automatically detects changes and deletions. For example, each time a new object is returned during enumeration, synchronization manager 748 attempts to find an object in its previously saved list of objects which represents the same object. If no matching handle is found, synchronization manager 748 determines that a new object has been created and saved on the object store which enumerated the object under consideration. In order to determine whether matching handles are found, as is indicated by block 866, synchronization manager 748 calls the interface method IReplStore::CompareItem.

Based on a comparison of the handles, synchronization manager 748 creates any necessary handle-to-object mappings in reference store 750 such that objects in the object stores on computing device 14 can be mapped to corresponding instances of the same object on device 12. This is indicated by block 868.

Synchronization manager 748 also determines whether any objects have been added, deleted, or modified in the particular object store from which they were enumerated. This is indicated by blocks 870. For example, if the list of objects which were previously synchronized contains a handle that is not found in the newly created list based upon a current enumeration of synchronization providers 752-754, that indicates that the object has been deleted from the corresponding data store 32, 34. Thus, synchronization manager 748 determines that the object must also be deleted from the mobile device 12 during the next synchronization operation.

Similarly, if the enumeration of objects produces an object handle which does not occur in the list of objects previously synchronized, then synchronization manager 748 determines that an object corresponding to that particular handle has been added to the object store which enumerated the object. Thus, during the next synchronization operation, the object must be added to mobile device 12.

Synchronization manager 748 also calls the interface method IReplStore::IsItemChanged with matching handles from the first and second lists. Calling this interface causes the appropriate provider 752 or 754 (whichever enumerated the matching handle) to determine whether the object has changed since its handle was last written to reference store 750. In one illustrative embodiment, the provider examines the time stamp information or version number information associated with the object handle. If that information is not identical, that indicates that there has been a change to the object. Thus, during the next synchronization process, synchronization manager 748 must update the corresponding object on mobile device 12 (assuming there is no conflict as discussed below).

Synchronization manager 740 on mobile device 12 also interacts with synchronization providers 744 and 746 to determine whether any objects on object stores 20 and 22 have been added, deleted, or changed since the last synchronization process. On mobile device 14, the operating system posts a message to synchronization manager 740 every time an object on mobile device 12, which is to be synchronized, changes, is added, or is deleted. Synchronization manager 740 enumerates each object and calls methods in the IreplNotify interface of each provider 744 and 746. Based on this call, the provider determines whether the particular object enumerated is to be synchronized and indicates to synchronization manager 740 how many objects are to be synchronized (for example, a file system object, such as a directory, actually contains more than one object which is to be synchronized).

Based on the notifications posted from the operating system, synchronization manager 740 maintains a list, or array, of objects which have changed, been deleted, or added since the last synchronization process. Upon connection to computing device 14, this list is provided to synchronization manager 748. Thus, synchronization manager 748 contains the lists which have been constructed for both desktop 14 and mobile device 12 which indicate objects which need to be synchronized. This is indicated by block 872 in FIG. 8B.

Synchronization manager 748 then determines, as indicated at block 874, whether an object has changed only on mobile device 12, only on computing device 14, or on both mobile device 12 and computing device 14. If the object has changed only on one of the desktop object stores, then synchronization manager 748 carries out the necessary activity to update the corresponding object store on the mobile device. This is indicated by block 876. If the object has changed only on one of the mobile device stores, then synchronization manager 748 carries out the necessary activities to update the corresponding object store on the computing device 14. This is indicated by block 880.

However, if the same object has changed on both mobile device 12 and computing device 14, then a conflict situation arises. In one illustrative embodiment, synchronization manager 748 makes a call to the registry in the operating system of computing device 14 to obtain conflict information which instructs synchronization manager 748 how to proceed in the face of a conflict. This is indicated by block 878. For example, the user may have set preferences which indicate that, in the case of a conflict either the desktop computer version, or the mobile device version should take precedence every time. Similarly, the user may have set a preference which indicates that the user is to be notified in the case of a conflict so that the user can actively decide which version will take precedence. In that case, synchronization manager 748 generates a user interface allowing the user to resolve the conflict. Synchronization manager 748 then takes the necessary steps to resolve the conflict and update the appropriate object store. This continues until all objects in the lists of objects to be synchronized have been dealt with. This is indicated by block 882.

In order to exchange objects with mobile device 12, synchronization manager 748 continually calls the method IReplObjHandler:GetPacket to have an appropriate provider 752 or 754 obtain a packet of information to be transmitted to mobile device 12. To handle a packet received from mobile device 12, synchronization manager 748 calls IReplObjHandler::SetPacket. This acts to provide a packet of information received from mobile device 12 to a synchronization provider 754 for storage on its associated object store. Similar interfaces are called by synchronization manager 740 on mobile device 12.

Responding to Truncated Electronic Mail Messages

In order to process electronic mail messaging, the system shown in FIG. 1 (and described in greater detail with respect to FIGS. 6-8B) can perform a number of features in order to accommodate the relatively limited and expensive bandwidth associated with wireless transmissions. For example, in one embodiment, computing device 14 sends electronic mail messages of only a predetermined length to the mobile device 12. In such an embodiment, a user can optionally select a predetermined number of lines of text in the main message body which the user wishes to receive. This is indicated to computing device 14. Thereafter, when computing device 14 receives an electronic mail message which is to be transmitted (through the synchronization protocol or otherwise) to mobile device 12, computing device 14 truncates the message body to the predetermined number of lines and sends the truncated electronic mail message to mobile device 12. When the user reviews the truncated electronic mail message, the user can select that message for a complete download, in which case computing device 14 downloads the entire message body to mobile device 12 so that the user can review the entire message.

In the past, in order to forward, or reply to, a truncated electronic mail message, the user could simply enter the forward or reply comments, as is conventional, and send the message. In that case, the truncated message was transmitted to computing device (again through the synchronization protocol or otherwise) and was forwarded to the recipients indicated by the user in the reply or forwarded message. If the user wished to forward the entire message, then the user was first required to mark the entire message for a complete download and have the entire text body downloaded to the mobile device from device 14. The user could then reply to, or forward, the entire mail message, along with the reply or forwarding comments. The reply or forward would then be transmitted back to computing device 14 and on to the eventual recipients.

The same general framework also existed for attachments. In other words, the user could designate whether attachments were to be sent to the mobile device 12 in the first instance. If not, then in order to forward the message along with attachments, or reply to the message including the attachments in the reply, the user was first required to mark the attachments for download to the mobile device, then respond to the fully downloaded electronic mail message (including attachments).

As can be seen, this technique uses an undesirable amount of bandwidth. There are many instances in which the user may wish to forward the full original electronic mail message, including attachments, to a recipient, or the user may wish to reply to the message, including the full original electronic mail message (the entire textual body and attachments). However, in such instances, the user may well not need to review the full original electronic mail message prior to replying to it or forwarding it. Therefore, by requiring the user to download the entire electronic mail message (text body and/or attachments) to the mobile device 12 when they are unneeded, and then requiring the mobile device 12 to re-transmit the entire electronic mail message back to computing device 14 (before it is sent to the correct recipients) utilizes an undesirably large amount of wireless bandwidth, and also requires unnecessary steps on the part of the user.

In accordance with one embodiment of the present invention, the user of mobile device 12 can send replies to truncated electronic mail messages and yet still send the entire body of the original message, without having to download it locally to the mobile device 12 and then re-transmit it in its entirety back to device 14. The same technique is used, in accordance with another embodiment of the present invention, with attachments which were attached to the original electronic mail message.

Figure 9:
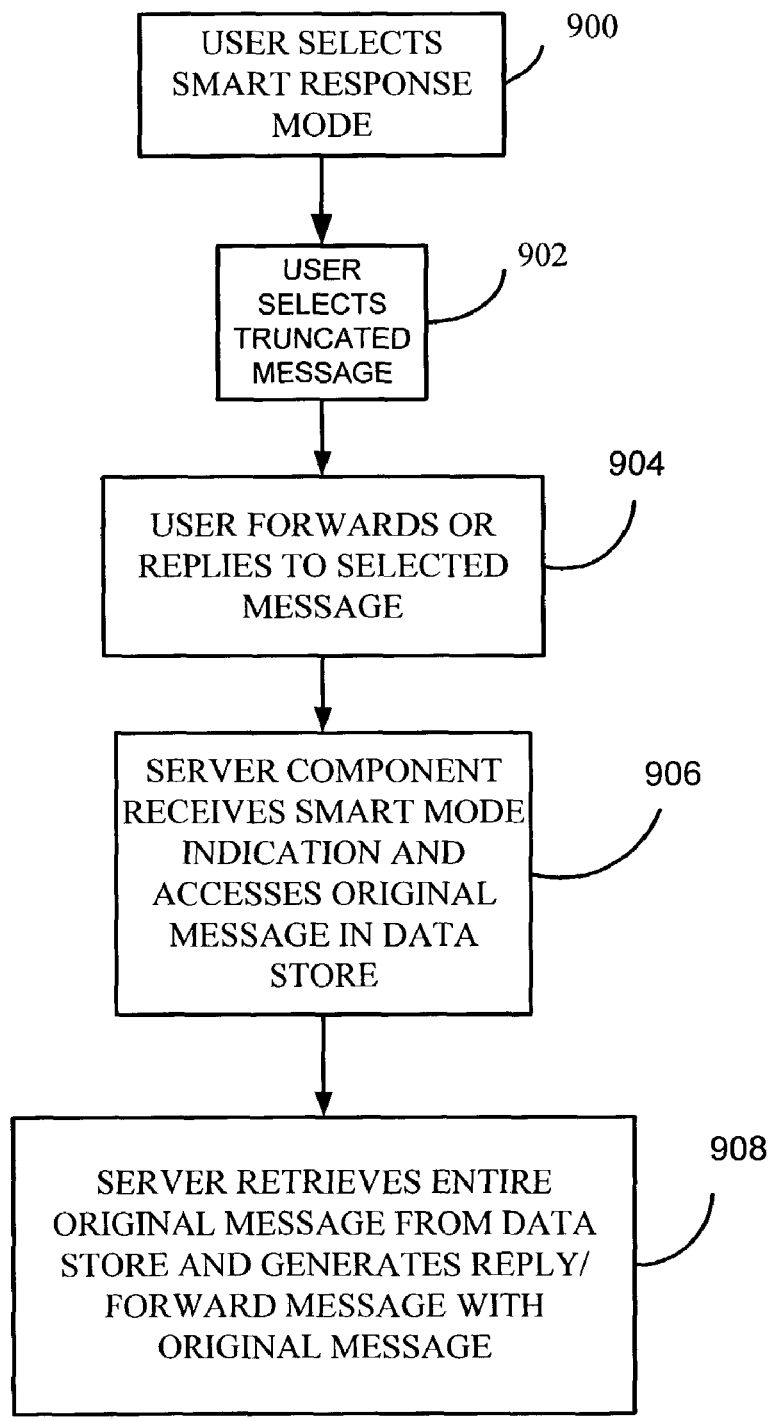
FIG. 9 is a flow diagram illustrating the operation of a forward and reply feature in accordance with one embodiment of the present invention.
Figure 10:
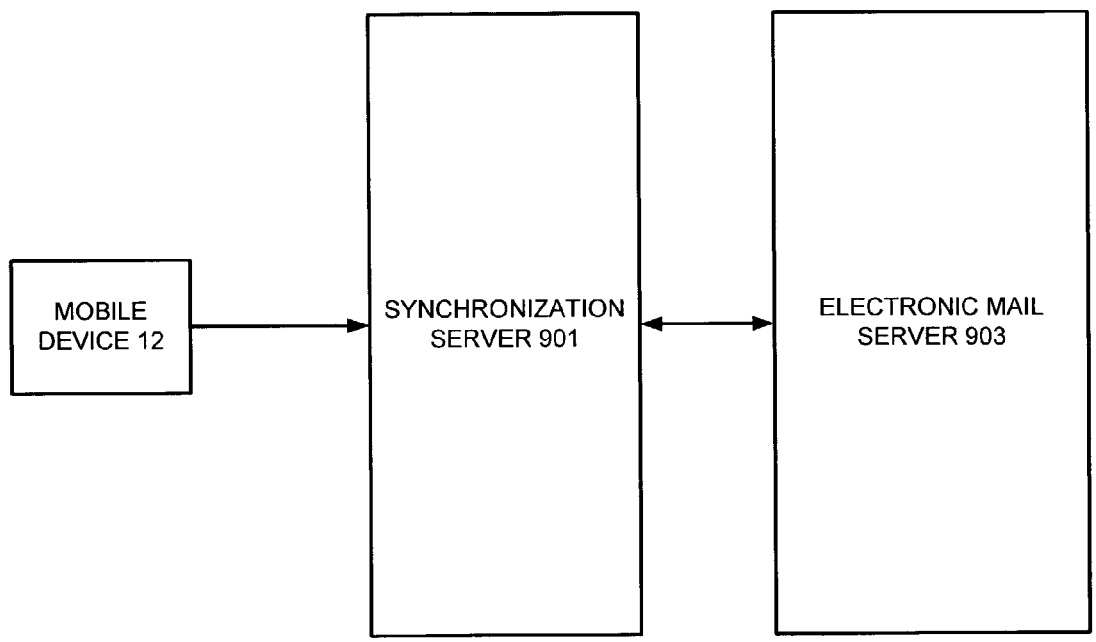
FIG. 10 is a block diagram illustrating one embodiment of the invention.

FIG. 9 is a flow diagram illustrating one embodiment accordingly to which the present invention operates. FIG. 10 is a block diagram showing mobile device 12 connected (such as by a wireless connection—e.g., a cellular connection) to a synchronization server 901 which can include the components shown in computing device 14, for instance. Synchronization server 901 is shown connected to an electronic mail server 903 which includes components required to send and receive electronic mail messages.

It will first be assumed that the user has received a truncated electronic mail message on mobile device 12. By truncated electronic mail message, it is meant that the original electronic mail message is received on mobile device 12 either with a truncated message body, or with attachments that have been truncated, or without attachments, or a combination of these.

In order to forward or reply to the original truncated electronic mail message, but where the reply or forwarded message includes some or all of the original message in non-truncated form (such as with attachments or with the full message body or both), the user first selects a smart response mode. This is indicated by block 900 in FIG. 9. This can be accomplished in any of a wide variety of ways. For example, when replying to, or forwarding, a truncated electronic mail message on the mobile device 12, the user interface generated on the mobile device 12 can include a simple checkbox which the user can check in order to operate in the smart response mode. Any of a wide variety of other known ways can be used to implement the smart response features as well. Also, the smart response mode can occur automatically with no user input required.

When the user has selected to operate in the smart response mode, the user selects the truncated message for forwarding or for replying. This is indicated by block 902. Next, the user forwards or replies to the original truncated message as indicated by block 904. This is illustratively accomplished in a known manner, such as by simply entering the reply message or forwarding comments, and then selecting a send option on the user interface to send the forwarded electronic mail message or reply.

As the mobile device 12 sends the message to synchronization server 901 (through synchronization or otherwise), it includes in its header an identity of the original electronic mail message stored on electronic mail server 903 (or which is stored on PIM object store 32 on computing device 14 in the embodiment shown in FIG. 1). It also includes in the header information an indication that the user has selected to operate in the smart response mode. This is indicated by block 906 in FIG. 9.

Having received these indications, the server 901 fetches the original electronic mail message identified by the message ID in the header information from a data store on electronic mail server 903 (or computing device 14 accesses the PIM object store 32 to retrieve the original electronic mail message). The synchronization server 901 then generates a complete message based on the message received from mobile device 12 and the entire original electronic mail message (with or without attachments as selected by the user) and sends the complete message to the electronic mail server 903 to the appropriate recipient. This is indicated by block 908 in FIG. 9.

Generating the complete message can be done in a number of ways. For example, in one illustrative embodiment, server 901 takes the reply electronic mail message, or the forwarded electronic mail message, from mobile device 12 and attaches to that message the original electronic mail message, and attachments, which have been retrieved from electronic mail server 903 (or PIM object store 32). Therefore, the eventual recipient of the reply or forwarded message can view the entire original message as well.

In another embodiment, server 901 creates a new electronic mail object based on the reply or forwarded message received from mobile device 12, and also based on the retrieved original electronic mail message which was retrieved from server 903 (or PIM object store 32). The new electronic mail object contains not only the comments or reply entered by the user of mobile device 12, but also the entire original mail message.

In yet another embodiment, server 901 can simply modify the electronic mail message object it received from mobile device 12 by replacing the truncated text message with the entire text message found in the original electronic mail message retrieved from PIM object store 32. Of course, computing device 14 can also attach the original attachments before sending the electronic mail message object on to the eventual recipient.

Of course, other embodiments can be used as well. For example, server 901 can simply attach the textual body of the original message retrieved from server 903 as an attachment to the message received from mobile device 12.

It should also be noted that the present invention can be implemented on either replies to truncated messages, forwarding of truncated messages, or both, as desired. This can be selectable through a suitable user interface, or it can be automatically set when the device is manufactured.

It should also be noted that it may sometimes be acceptable to lose part of a message body in simple round-trip replies between electronic mail recipients. However, it can be important to maintain the entire electronic mail message body in reply threads to which new recipients are added, from time to time, to ongoing electronic mail conversations. The present invention allows the user to send comments along with the text version of the original mail without requiring the user to download the entire message to the mobile device 12 and then re-transmit it back to the computing device 14.

Other operational features can be used as well. For example, if the user edits any portion of the truncated message, then the server may optionally simply send the reply or forwarded message that includes the edited truncated portion, without attaching the original message. This is, of course, optional.

Although the present invention has been described with reference to preferred embodiments, workers skilled in the art will recognize that changes may be made in form and detail without departing from the spirit and scope of the invention.

What is claimed is:

1. A computer implemented method of sending an electronic mail (e-mail) message in response to an original e-mail message having a message body, comprising:
   generating, by a server, a message identifier associated with the original e-mail message;
   storing by the server, the original e-mail message in a data store;
   storing, by the server, the message identifier associated with the original e-mail message in the data store;
   generating, by the server, a truncated e-mail message, the truncated e-mail message including at least a portion of the message body of the original e-mail message and including less than the message body of the original e-mail message;
   sending, from the server, the truncated e-mail message and the message identifier associated with the original e-mail message to a mobile device;
   receiving, at the server, a responsive message from the mobile device, responsive to the truncated e-mail message, the responsive message including:
      a recipient of a resultant e-mail message, and
      the message identifier associated with the original e-mail message;
   retrieving, by the server, the original e-mail message from the data store using the message identifier associated with the original e-mail message;
   generating, by the server, the resultant e-mail message by appending the original e-mail message to at least a portion of the responsive message; and
   sending, from the server to the recipient, in response to the responsive message, the resultant e-mail message.

2. The method of claim 1 wherein the responsive message is a reply e-mail message.

3. The method of claim 1 wherein the responsive message is a forward e-mail message.

4. The method of claim 1 wherein the original e-mail message includes at least one attachment, and wherein sending the truncated e-mail message comprises:
   sending, by the server, the truncated e-mail message to the mobile device without the at least one attachment.

5. The method of claim 4 wherein sending the recipient the resultant e-mail message comprises:
   attaching, by the server, the at least one attachment to the resultant e-mail message prior to sending the resultant email message.

6. The method of claim 1 wherein receiving the responsive e-mail message comprises:
   receiving, by the server, a complete message indicator indicating that the resultant e-mail message is to be sent.

7. The method of claim 1 wherein the truncated e-mail message is of a predetermined length.

8. The method of claim 7 wherein the predetermined length is determined by a response indicator.

9. A tangible computer storage medium storing instructions which, when executed by a computer, cause the computer to execute a method of sending an electronic (e-mail) message in response to an original e-mail message having a message body, the method comprising:
   generating, by a server, a message identifier associated with the original e-mail message;
   storing, by the server, the original e-mail message in a data store;
   storing, by the server, the message identifier associated with the original e-mail message in the data store;
   generating, by the server, a truncated e-mail message, the truncated e-mail message including at least a portion of the message body of the original e-mail message and including less than the message body of the original e-mail message;
   sending, from the server, the truncated e-mail message and the message identifier associated with the original e-mail message to a mobile device;
   receiving, at the server, a responsive message from the mobile device, responsive to the truncated e-mail message, the responsive message including;
   a recipient of a resultant e-mail message, and the message identifier associated with the original e-mail message;

retrieving, by the server, the original e-mail message from the data store using the message identifier associated with the original e-mail message;

generating by the server, the resultant e-mail message by appending the original e-mail message to at least a portion of the responsive message; and sending, from the server to the recipient, in response to the responsive message, the resultant e-mail message.

10. The tangible computer storage medium of claim 9 wherein the responsive message is a reply e-mail message.

11. The tangible computer storage medium of claim 9 wherein the responsive message is a forward e-mail message.

12. A tangible computer storage medium storing computer readable instructions which, when executed by a computer cause the computer to execute a method of sending an electronic mail (e-mail) message in response to an original email message having a message body, the method comprising:

generating, by a server, a message identifier associated with the original e-mail message;

storing, by the server, the original e-mail message in a data store;

storing, by the server, the message identifier associated with the original e-mail message in the data store;

generating, by the server, a truncated e-mail message, the truncated e-mail message including at least a portion of the message body of the original e-mail message and including less than the message body of the original e-mail message;

sending, from the server, the truncated e-mail message and the message identifier associated with the original e-mail message to a mobile device;

receiving, at the server, a responsive message from the mobile device, responsive to the truncated e-mail message, identifying a recipient of a resultant message;

receiving, by the server, the message identifier associated with the original e-mail message;

retrieving, by the server, the original e-mail message from the data store using the message identifier associated with the original e-mail message; and sending, from the server to the recipient, in response to the responsive message, the resultant e-mail message including a portion of the original e-mail message removed from the truncated e-mail message.

* * * * *